(12) United States Patent
Lang et al.

(10) Patent No.: US 9,783,036 B2
(45) Date of Patent: Oct. 10, 2017

(54) TWIN-WHEEL DRIVE MODULE

(71) Applicant: Siemens Aktiengesellschaft, München (DE)

(72) Inventors: Hans-Peter Lang, Eckental/Brand (DE); Thomas Oehler, Chemnitz (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/193,828

(22) Filed: Feb. 28, 2014

(65) Prior Publication Data

US 2014/0245862 A1    Sep. 4, 2014

(30) Foreign Application Priority Data

Mar. 1, 2013   (DE) .......................... 10 2013 203 567

(51) Int. Cl.

| | |
|---|---|
| *B60K 7/00* | (2006.01) |
| *B60K 1/02* | (2006.01) |
| *B60K 17/04* | (2006.01) |
| *B64F 1/22* | (2006.01) |

(52) U.S. Cl.
CPC .............. *B60K 1/02* (2013.01); *B60K 7/0007* (2013.01); *B60K 17/043* (2013.01); *B60K 17/046* (2013.01); *B60K 2007/0038* (2013.01); *B60K 2007/0061* (2013.01); *B60Y 2200/145* (2013.01); *B60Y 2200/1422* (2013.01); *B64F 1/22* (2013.01); *Y10T 74/19051* (2015.01)

(58) Field of Classification Search
CPC ................ B60K 7/0007; B60K 17/043; B60K 2007/0038; B60K 2007/0053; B60G 5/025; B60G 5/02
See application file for complete search history.

(56) References Cited

U.S. PATENT DOCUMENTS

| | | | | |
|---|---|---|---|---|
| 1,540,526 | A * | 6/1925 | Anglada .................. | B60K 1/02 180/57 |
| 2,808,269 | A * | 10/1957 | Cathey ................... | B62D 15/00 280/124.113 |

(Continued)

FOREIGN PATENT DOCUMENTS

| | | |
|---|---|---|
| CN | 1072980 A | 6/1993 |
| DE | 1480141 A1 | 1/1970 |

(Continued)

*Primary Examiner* — William Kelleher
*Assistant Examiner* — Gregory Prather
(74) *Attorney, Agent, or Firm* — Henry M. Feiereisen LLC

(57) ABSTRACT

A twin-wheel drive module for driving two vehicle wheels which are disposed spaced axially from one another and rotatable around two axes of rotation aligned with one another. For driving each vehicle wheel, provision is made for a traction motor having a motor shaft disposed in parallel to the axes of rotation, a transmission having an input shaft which is connected to the motor shaft of the traction motor and an output shaft in alignment with the axes of rotation, and a second transmission. The second transmission has an input shaft, which is connected to the output shaft of the first transmission, and an output shaft which rotates around a common axis of rotation with the input shaft configured to receive the vehicle wheel.

21 Claims, 2 Drawing Sheets

(56) References Cited

U.S. PATENT DOCUMENTS

| | | | | |
|---|---|---|---|---|
| 4,903,613 | A * | 2/1990 | Lang | B61F 5/38 |
| | | | | 105/167 |
| 7,077,220 | B2 * | 7/2006 | Dunn | B60B 35/003 |
| | | | | 16/35 D |
| 2003/0024223 | A1 * | 2/2003 | Jager | B60G 5/025 |
| | | | | 56/7 |
| 2004/0094928 | A1 * | 5/2004 | Amanuma | B60G 3/20 |
| | | | | 280/124.125 |
| 2010/0230182 | A1 * | 9/2010 | Otto | B60B 33/045 |
| | | | | 180/6.48 |
| 2011/0259657 | A1 * | 10/2011 | Fuechtner | B60K 6/52 |
| | | | | 180/65.21 |
| 2012/0019172 | A1 * | 1/2012 | Zing | B60L 15/2045 |
| | | | | 318/8 |
| 2014/0061376 | A1 * | 3/2014 | Fisher | B60K 1/00 |
| | | | | 244/62 |

FOREIGN PATENT DOCUMENTS

| | | |
|---|---|---|
| DE | 19709577 A1 | 10/1998 |
| DE | 19945345 A1 | 4/2001 |
| DE | 102010001750 A1 | 8/2011 |
| DE | 102010017966 A1 | 10/2011 |
| DE | 102011116528 A1 | 6/2012 |
| EP | 1329352 A2 | 7/2003 |
| EP | 1650055 A2 | 4/2006 |
| WO | WO 9840235 A1 | 9/1998 |

* cited by examiner

TWIN-WHEEL DRIVE MODULE

CROSS-REFERENCES TO RELATED APPLICATIONS

This application claims the priority of German Patent Application, Serial No. 10 2013 203 567.5, filed Mar. 1, 2013, pursuant to 35 U.S.C. 119(a)-(d), the disclosure of which is incorporated herein by reference in its entirety as if fully set forth herein.

BACKGROUND OF THE INVENTION

The present invention relates to a twin-wheel drive module for driving two vehicle wheels.

The following discussion of related art is provided to assist the reader in understanding the advantages of the invention, and is not to be construed as an admission that this related art is prior art to this invention.

Twin-wheel drive modules are normally employed for heavy-duty vehicles, such as for aircraft tractors or the like and have a hydrostatic drive unit which is driven by a drive machine, such as via an internal combustion engine for example. Usually the hydrostatic drive unit has one or more hydraulic pumps driven by the drive machine and two hydraulic motors connected thereto which, when in its intended state, respectively drive the vehicle wheels held on the twin-wheel drive module.

It would be desirable and advantageous to provide an improved twin-wheel drive module which obviates prior art shortcomings and which operates at high level of efficiency and is low-cost in repair and maintenance.

SUMMARY OF THE INVENTION

According to one aspect of the present invention, a twin-wheel drive module for driving two vehicle wheels arranged in axial spaced-apart relationship for rotation about two aligned axes of rotation, includes a first traction motor having a motor shaft disposed in parallel relation to the axes of rotation, a first transmission having an input shaft connected to the motor shaft of the first traction motor and an output shaft in alignment with the axes of rotation, a second transmission having an input shaft connected to the output shaft of the first transmission and an output shaft rotating around a common axis of rotation with the input shaft and configured to receive a first one of the vehicle wheels, a second traction motor having a motor shaft disposed in parallel relation to the axes of rotation, a third transmission having an input shaft connected to the motor shaft of the second traction motor and an output shaft in alignment with the axes of rotation, and a fourth transmission having an input shaft connected to the output shaft of the third transmission and an output shaft rotating around a common axis of rotation with the input shaft and configured to receive a second one of the vehicle wheels.

The present invention resolves prior art shortcomings by using two traction motors to respectively drive the vehicle wheels disposed on the twin-wheel drive module. The motor shafts of the traction motors extend in parallel relation and are thereby disposed at a distance from the axes of rotation of the vehicle wheels, in order to create a space between them for accommodating further components to be attached to the twin-wheel drive module, especially for a central hydraulic cylinder, via which in the state of the twin-wheel drive module disposed as intended, the shock absorbing or the like are realized. In order to achieve such an off-center arrangement of the traction motors, each traction motor is connected to a transmission of which the input shaft is connected to the motor shaft of the corresponding traction motor and of which the output shaft is aligned with the axis of rotation of the vehicle wheel to be driven. Connected in turn to this transmission is a further transmission, of which the input shaft and output shaft are aligned with one another, wherein the output shaft is embodied for accepting the vehicle wheel to be driven. Both transmissions provided for each vehicle wheel jointly realize the required reduction gearing. In this way a very compact twin-wheel drive module is created, which can be attached to a vehicle frame of a corresponding vehicle.

Advantageously, the two traction motors, the first and the third transmission and also the second and the fourth transmission are embodied identically in each case so as to realize a very simple structure of the twin-wheel drive module. A further advantage of a twin-wheel drive module according to the invention is its high level of efficiency. In addition, repair and maintenance costs are very low, since the components of the twin-wheel drive module are designed for durability, so that there is merely provision for replacing the transmission rolling bearings. It is further advantageous that, by comparison with a hydrostatic drive unit, the complex installation of the oil supply and the activation of the hydraulic motors are dispensed with. In addition the electric traction motors can be used as generator-type operational brakes, which makes it possible to brake the vehicle in an almost wear-free manner.

According to another advantageous feature of the present invention, the first and second traction motors can be configured as asynchronous motors, especially as high-speed asynchronous motors.

According to another advantageous feature of the present invention, the first transmission and the third transmission can each be configured as a spur gearing. As a result costs are low and the overall construction is compact.

According to another advantageous feature of the present invention, the first transmission and the third transmission can each be configured as reduction gearing with a transmission ratio between 2 and 3.

According to another advantageous feature of the present invention, the second transmission and the fourth transmission can each be configured as planetary gearing. As a result, a simple and low-cost structure is realized.

According to another advantageous feature of the present invention, the second transmission and the fourth transmission are each configured as reduction gearing with a transmission ratio between 15 and 20.

According to another advantageous feature of the present invention, a carrier can be provided to connect the first transmission and the third transmission to each other to jointly form a support structure of the twin-wheel drive module. The support structure introduces vehicle wheel forces, in the intended state of the twin-wheel drive module, via the second transmission and the fourth transmission into the vehicle. A significant advantage of such a carrier, which connects the first transmission to the third transmission, lies in the twin-wheel drive module not needing any separate module frame.

According to another advantageous feature of the present invention, a receptacle can be provided on the carrier and a longitudinal bolt can be slidingly supported in the receptacle for connecting the twin-wheel drive module to a vehicle frame. In this way a very simple attachment of the twin-wheel drive module to a vehicle is guaranteed.

According to another advantageous feature of the present invention, the longitudinal bolt can be configured to permit the twin-wheel drive module to tilt around the longitudinal bolt in a range of ±2° to ±5°. When the twin-wheel drive module is in an intended state, compensation for unevenness of the road surface is possible.

According to another advantageous feature of the present invention, a hydraulic cylinder can be disposed between the first traction motor and the second traction motor. When the twin-wheel drive module is disposed in its intended state, damping, springing and/or height adjustment of the vehicle can be realized via the hydraulic cylinder. To arrange the hydraulic cylinder, an essentially forked receptacle can be embodied on the upper side of the transverse carrier, which serves to accept and attach the hydraulic cylinder.

According to another advantageous feature of the present invention, the first traction motor and the second traction motor can be disposed in a V shape, when viewed in a direction of the axes of rotation of the vehicle wheels. In this way a very robust and space-saving structure is achieved.

According to another aspect of the present invention, a heavy-duty vehicle includes a plurality of twin-wheel drive modules, with each twin-wheel drive module being realized in a manner as described above. An example of a heavy-duty vehicle includes an airfield tractor.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
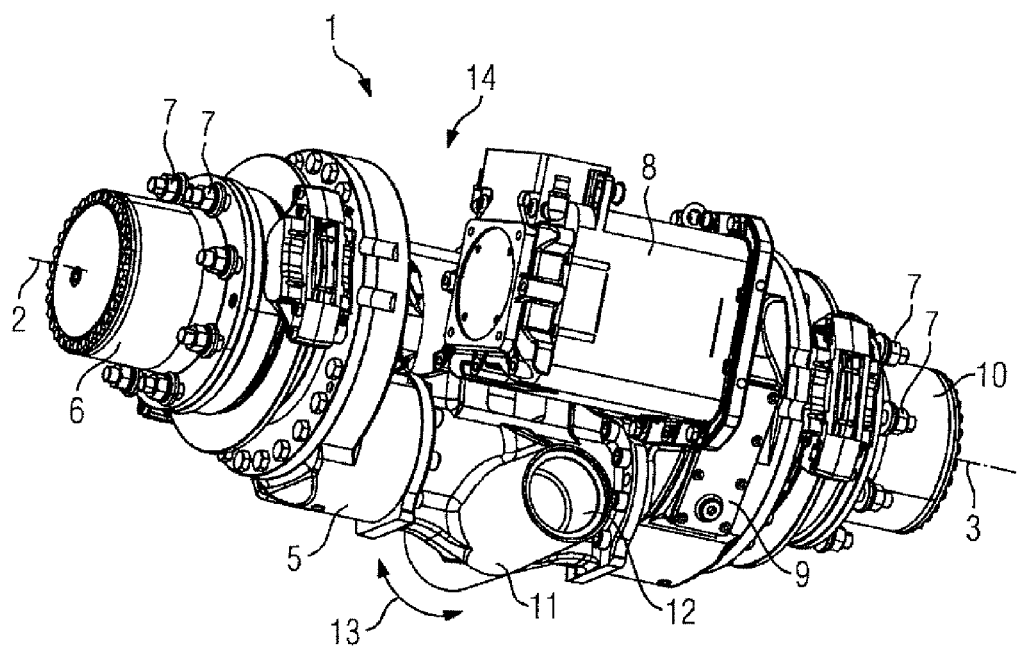
FIG. 1 is a side perspective view of a twin-wheel drive module according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side perspective view of a twin-wheel drive module according to the present invention, generally designated by reference numeral 1. The twin-wheel drive module 1 is provided to drive two vehicle wheels, which are not shown in any greater detail here, disposed spaced axially from one another and able to rotate around two axes of rotation 2 and 3 aligned with one another.

For driving the first vehicle wheel, the twin-wheel drive module 1 includes a first traction motor 4, a first transmission 5 and a second transmission 6. The traction motor involves a high-speed asynchronous motor, of which the motor shaft is not shown in any greater detail and is disposed in parallel to the axis of rotation 2 of the first vehicle wheel and spaced away from said axis. The first transmission 5 involves spur gearing, of which the input shaft is connected to the motor shaft of the first traction motor 4 and of which the output shaft aligns with the axis of rotation 2 of the first vehicle wheel. The first transmission 5 thus serves to compensate for the axis offset between the motor shaft of the first traction motor 4 and the axis of rotation 2, wherein a reduction with a transmission ratio i=2 is simultaneously realized via the first transmission 5. The second transmission 6 involves planetary gearing, of which the input shaft is connected to the output shaft of the first transmission 5 and of which the output shaft rotating around a common axis of rotation with the input shaft is embodied for accepting the first vehicle wheel. In other words, the rim of the first vehicle wheel is defined by the screw connections 7 on the output shaft of the second transmission 6. Via the second transmission 6 a further reduction with a transmission ratio i=15 is obtained, so that the first transmission 5 and the second transmission 6 overall realize a transmission ratio I=30.

For driving the second vehicle wheel the twin-wheel drive module 1 includes a second traction motor 8, a third transmission 9 and a fourth transmission 6, wherein the second traction motor 8, is embodied similarly to the first traction motor 4, the third transmission 9 is embodied similarly to the first transmission 5 and the fourth transmission 10 similarly to the second transmission 6, so that further explanation is omitted for the sake of simplicity.

Figure 2:
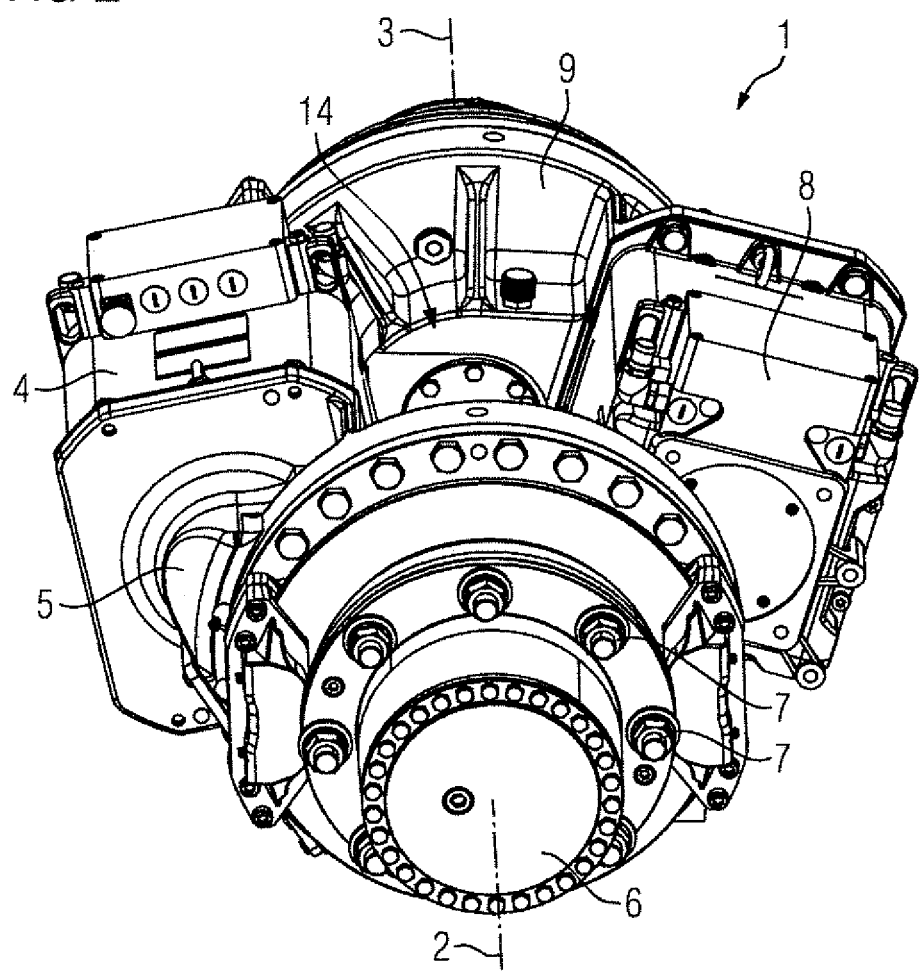
FIG. 2 is a top and end perspective view of the twin-wheel drive module shown in FIG. 1.

The first traction motor 4 and the second traction motor 8, when the twin-wheel drive module is viewed in the direction of the axes of rotation 2 and 3, are disposed in a V shape, as can be seen in FIG. 2, wherein their motor shafts point in opposite directions.

The first transmission 5 and the third transmission 9 are connected to one another via a carrier 11 and with this form the support structure of the twin-wheel drive module 1. Provided on the carrier 11 is a receptacle 12 for sliding support of a longitudinal bolt not shown in any greater detail, via which, when the module is disposed in its intended state, the twin-wheel drive module 1 is connected to a vehicle frame. The longitudinal bolt and its sliding support are embodied such that they permit the twin-wheel drive module 1 to tilt around the longitudinal bolt by ±3°, as is indicated in FIG. 1 by double-ended arrow 13. On its upper side the carrier 11 is provided with a receptacle 14 essentially embodied in a fork shape which serves to accept and attach a hydraulic cylinder not shown in any greater detail, via which for example the damping, springing and/or height adjustment of the vehicle is realized.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:
1. A twin-wheel drive module for driving two vehicle wheels arranged in axial spaced-apart relationship for rotation about two aligned axes of rotation which form together a common axis of rotation, said drive module comprising:

a first traction motor having a motor shaft disposed in parallel relation to the axes of rotation;

a first transmission having an input shaft connected to the motor shaft of the first traction motor and an output shaft in alignment with the axes of rotation;

a second transmission having an input shaft connected to the output shaft of the first transmission and an output shaft rotating around a common axis of rotation with the input shaft and configured to receive a first one of the vehicle wheels;

a second traction motor having a motor shaft disposed in parallel relation to the axes of rotation;

a third transmission having an input shaft connected to the motor shaft of the second traction motor and an output shaft in alignment with the axes of rotation; and a fourth transmission having an input shaft connected to the output shaft of the third transmission and an output shaft rotating around the common axis of rotation with the input shaft and configured to receive a second one of the vehicle wheels, wherein the first traction motor and the second traction motor have flat sides and are arranged so that the flat sides of the first traction motor and the flat sides of the second traction motor are disposed in a V shape, when viewed in a direction of the axes of rotation of the vehicle wheels.

2. The twin-wheel drive module of claim 1, wherein the first and second traction motors are configured as asynchronous motors.

3. The twin-wheel drive module of claim 1, wherein the first transmission and the third transmission are each configured as a spur gearing.

4. The twin-wheel drive module of claim 1, wherein the first transmission and the third transmission are each configured as reduction gearing with a transmission ratio between 2 and 3.

5. The twin-wheel drive module of claim 1, wherein the second transmission and the fourth transmission are each configured as planetary gearing.

6. The twin-wheel drive module of claim 1, wherein the second transmission and the fourth transmission are each configured as reduction gearing with a transmission ratio between 15 and 20.

7. The twin-wheel drive module of claim 1, further comprising a carrier configured to connect the first transmission and the third transmission to each other to jointly form a support structure of the twin-wheel drive module.

8. The twin-wheel drive module of claim 7, further comprising a receptacle provided on the carrier and a longitudinal bolt slidingly supported in the receptacle for connecting the twin-wheel drive module to a vehicle frame.

9. The twin-wheel drive module of claim 8, wherein the longitudinal bolt is configured to permit the twin-wheel drive module to tilt around the longitudinal bolt in a range of ±2° to ±5°.

10. The twin-wheel drive module of claim 1, further comprising a hydraulic cylinder disposed between the first traction motor and the second traction motor.

11. A heavy-duty vehicle, comprising a plurality of twin-wheel drive modules, each said twin-wheel drive modules configured for driving two vehicle wheels arranged in axial spaced-apart relationship for rotation about two aligned axes of rotation which form together a common axis of rotation, said drive module including:

a first traction motor having a motor shaft disposed in parallel relation to the axes of rotation;

a first transmission having an input shaft connected to the motor shaft of the first traction motor and an output shaft in alignment with the axes of rotation;

a second transmission having an input shaft connected to the output shaft of the first transmission and an output shaft rotating around a common axis of rotation with the input shaft and configured to receive a first one of the vehicle wheels;

a second traction motor having a motor shaft disposed in parallel relation to the axes of rotation;

a third transmission having an input shaft connected to the motor shaft of the second traction motor and an output shaft in alignment with the axes of rotation; and a fourth transmission having an input shaft connected to the output shaft of the third transmission and an output shaft rotating around the common axis of rotation with the input shaft and configured to receive a second one of the vehicle wheels, wherein the first traction motor and the second traction motor have flat sides and are arranged so that the flat sides of the first traction motor and the flat sides of the second traction motor are disposed in a V shape, when viewed in a direction of the axes of rotation of the vehicle wheels.

12. The heavy-duty vehicle of claim 11, constructed in the form of an airfield tractor.

13. The heavy-duty vehicle of claim 11, wherein the first and second traction motors are configured as asynchronous motors.

14. The heavy-duty vehicle of claim 11, wherein the first transmission and the third transmission are each configured as a spur gearing.

15. The heavy-duty vehicle of claim 11, wherein the first transmission and the third transmission are each configured as reduction gearing with a transmission ratio between 2 and 3.

16. The heavy-duty vehicle of claim 11, wherein the second transmission and the fourth transmission are each configured as planetary gearing.

17. The heavy-duty vehicle of claim 11, wherein the second transmission and the fourth transmission are each configured as reduction gearing with a transmission ratio between 15 and 20.

18. The heavy-duty vehicle of claim 11, wherein a carrier is provided and configured to connect the first transmission and the third transmission to each other to jointly form a support structure of the heavy-duty vehicle.

19. The heavy-duty vehicle of claim 18, wherein twin-wheel drive module includes a receptacle provided on the carrier and a longitudinal bolt slidingly supported in the receptacle for connecting the heavy-duty vehicle to a vehicle frame.

20. The heavy-duty vehicle of claim 19, wherein the longitudinal bolt is configured to permit the heavy-duty vehicle to tilt around the longitudinal bolt in a range of ±2° to ±5°.

21. The heavy-duty vehicle of claim 11, wherein twin-wheel drive module includes a hydraulic cylinder disposed between the first traction motor and the second traction motor.

\* \* \* \* \*